(12) United States Patent
Sohn (10) Patent No.: US 8,411,056 B2
(45) Date of Patent: Apr. 2, 2013

(54) APPARATUS AND METHOD FOR TOUCH INPUT IN PORTABLE TERMINAL

(75) Inventor: Chang-Ho Sohn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 12/818,368

(22) Filed: Jun. 18, 2010

(65) Prior Publication Data

US 2010/0321322 A1 Dec. 23, 2010

(30) Foreign Application Priority Data

Jun. 19, 2009 (KR) .................. 10-2009-0054784

(51) Int. Cl.
*G06F 3/041* (2006.01)

(52) U.S. Cl. ......... 345/173; 345/174; 345/175; 345/104

(58) Field of Classification Search .................. None
See application file for complete search history.

(56) References Cited

U.S. PATENT DOCUMENTS

| 2008/0052945 | A1* | 3/2008 | Matas et al. | ...................... 34/173 |
| 2009/0160802 | A1* | 6/2009 | Yasumi | .......................... 345/173 |

* cited by examiner

*Primary Examiner* — Muhammad N Edun
(74) *Attorney, Agent, or Firm* — Jefferson IP Law, LLP (57) ABSTRACT

An apparatus and method for setting a control command in response to a touch area and controlling an application in a portable terminal through a simple touch input is provided. The apparatus includes a control command determination unit and a control unit. The control command determination unit detects a control command of an application corresponding to an area touched by a user when a touch input is sensed while the application works. The control unit controls an operation of the working application by using the control command detected by the control command determination unit.

20 Claims, 6 Drawing Sheets

APPARATUS AND METHOD FOR TOUCH INPUT IN PORTABLE TERMINAL

PRIORITY

This application claims the benefit under 35 U.S.C. §119(a) of a Korean patent application filed in the Korean Intellectual Property Office on Jun. 19, 2009 and assigned Serial No. 10-2009-0054784, the entire disclosure of which is hereby incorporated by reference.

BACKGROUND OF THE INVENTION

1. Field of the Invention

The present invention relates to an apparatus and a method for a touch interface in a portable terminal. More particularly, the present invention relates to an apparatus and method for controlling an application through a simple touch input after setting a command for controlling functions of the application according to an area touched by a user.

2. Description of the Related Art

Use of a portable terminal has rapidly and widely spread because of its portable convenience. Accordingly, a service provider and a mobile terminal manufacturer have competitively developed the portable terminal having more convenient functions.

For example, the portable terminal provides functions of a phone book, a game, a scheduler, a Short Message Service (SMS), a Multimedia Messaging Service (MMS), a broadcast message service, an internet service, an e-mail, a morning call, an MP3 player, a digital camera, and so on.

Further, a portable terminal including a touch screen, which can receive data through a user's hand or a stylus, has been developed. Using the stylus, it is easy and convenient that a text is written or a line is drawn in the portable terminal.

The portable terminal including a touch screen panel receives coordinate information of user's touch input thereon. For a user, the portable terminal including a touch screen provides more convenience compared to another portable terminal having plural key pads or buttons.

That is, a user using the portable terminal including the touch screen panel can input a message or execute an application through a simple touch input.

Recently, various touch input methods are provided for controlling overall operations of the portable terminal. For example, if a region is enlarged/reduced after two another regions positioned diagonally are touched, enlargement and reduction of an image may be possible.

However, in the method described above, it is required to touch two regions and the portable terminal should provide a multiple touch screen panel supporting simultaneous touches at two regions. Thus, the above method is inconvenient and limited for use in the portable terminal.

That is, the method described above is restrictedly applicable to a portable terminal supporting a multiple touch input. If a portable terminal having a conventional touch screen simultaneously receives touches at two regions, a touch input error may occur.

Accordingly, to address the problem described above, an apparatus and a method for controlling a portable terminal through a simple touch input are required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for controlling an application in a portable terminal through a simple touch input.

Another aspect of the present invention is to provide apparatus and method for providing a touch input effect such as a multiple touch input in a portable terminal.

In accordance with an aspect of the present invention, an apparatus for touch interface in a portable terminal is provided. The apparatus includes a control command determination unit configured to detect a control command of application corresponding to an area touched by a user when a touch input is sensed while the application works, and a control unit configured to control an operation of the working application by using the control command detected by the control command determination unit.

In accordance with another aspect of the present invention, a method for touch interface in a portable terminal is provided. The method includes detecting a control command of application corresponding to an area touched by a user when a touch input is sensed while the application works, and controlling an operation of the working application by using the control command detected by the control command determination unit.

In accordance with yet another aspect of the present invention, an apparatus for touch interface in a portable terminal is provided. The apparatus includes a control command determination unit configured to sense a touch input area touched by a user, and a control unit configured to map the touch input area sensed by the control command determination unit to a command for controlling a predetermined application.

In accordance with still another aspect of the present invention, a method for touch interface in a portable terminal is provided. The method includes sensing a touch input area touched by a user, and mapping the touch input area sensed by the control command determination unit to a command for controlling a predetermined application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an apparatus and a method for controlling an application through a simple touch input in a portable terminal according to an exemplary embodiment of the present invention is intended to provide or will be described in detail. The portable terminal includes a portable terminal supporting a multiple touch input as well as a portable terminal not supporting a multiple touch input.

Figure 1:
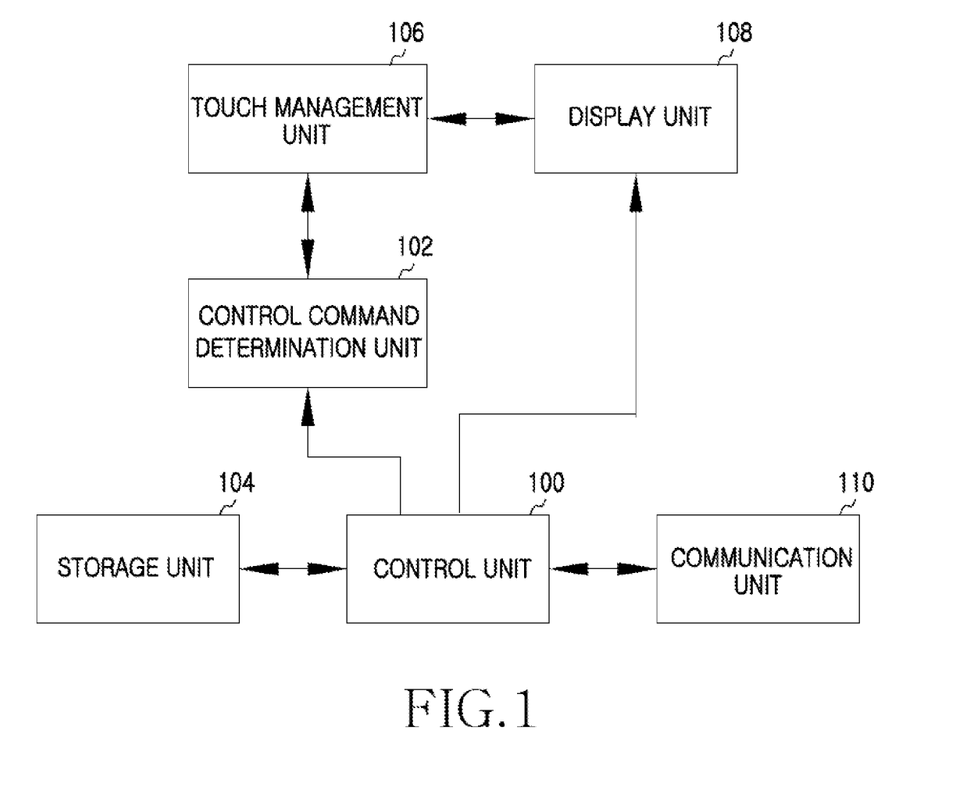
FIG. 1 is a block diagram illustrating a portable terminal configured to enhance a motion recognition function according to an exemplary embodiment of the present invention.

FIG. 1 is a block diagram illustrating a portable terminal configured to enhance a motion recognition function according to an exemplary embodiment of the present invention.

Referring to FIG. 1, the portable terminal includes a control unit 100, a control command determination unit 102, a storage unit 104, a touch management unit 106, a display unit 108, and a communication unit 110.

The control unit 100 in the portable terminal is for controlling overall operations of the portable terminal. For example, the control unit 100 performs processes for voice communication and data communication. According to an exemplary embodiment of the present invention, the control unit 100 controls not only typical functions but processes for setting each application command corresponding to each area touched by a user and determining an area touched by a user while the application is executed to perform an operation of the application corresponding to the area.

For example, while an image viewer is operated, the control unit 100 enlarges an output image, if there is a wide touch input according to user's touch input, and reduces the output image if there is a narrow touch input according to user's touch input.

The control command determination unit 102 determines a touch area touched by a user in response to an instruction of the control unit 100. Then, the control command determination unit 102 detects an application control command corresponding to the touch area and provides the application control command to the control unit 100. Further, when each application control command is set, the control command determination unit 102 determines each touch area corresponding to each application control command.

For example, if the control command determination unit 102 detects the application control command in response to a sensed touch area, the control command determination unit 102 determines the touch area touched by a user by calculating the number of pixels included in the touch area. That is, as the number of pixels in the touch area sensed by the control command determination unit 102 is increased, it can be determined that the touch area is enlarged.

Then, the control command determination unit 102 compares pixels in the touch area with a function control table and detects a control command corresponding to the touch input.

The storage unit 104 in the portable terminal may include a ROM, a RAM, a flash ROM, and the like. Herein, the ROM stores program micro codes (i.e., code) and various reference data for processing and controlling the control command determination unit 102.

The RAM used while the control unit 100 is operated stores temporary data generated while various programs are executed. Also, the flash ROM stores various data which can be updated such as a telephone directory, an outgoing message, an incoming message, and information of a touch area or a touch point input from a user. Further, the flash ROM stores the function control table defining control commands in response to touch areas input from a user.

The touch management unit 106 controlled by the control unit 100 senses the touch area input from a user and operates in response to the touch area. That is, when a touch input is received from a user, the touch management unit 106 provides location information of the touch input to the control unit 100 or determines data corresponding to the location information of the touch input to output the data to the display unit 108.

The display unit 108 displays state information, limited characters, plural videos and pictures, and so on. The display unit 108 may use a color Liquid Crystal Display (LCD), an Active Mode Organic Light Emitting Diode (AMOLED), and the like. The display unit 108 including a touch interface may be used as an input device when the display unit 108 applies to the portable terminal.

The communication unit 110 transmits and receives a wireless signal of data input and output via an antenna (not illustrated). For example, if data is transmitted, the communication unit 110 performs channel coding and spreading on the data and then performs a Radio Frequency (RF) process to transmit a wireless signal corresponding to the data. Otherwise, if data is received, the communication unit 110 transforms a received RF signal into a baseband signal and performs despreading and channel decoding on the baseband signal to restore the data.

The control command determination unit 102 includes functions controlled by the control unit 100. However, the above described construction including the control command determination unit 102 separate from the control unit 100 is an example for convenience of description. This is, it should not be considered as limiting the scope of the present invention, and the control command determination unit 102 can be variously designed according to exemplary embodiments of the present invention. For example, it is possible that all of functions included in the control command determination unit 102 may be controlled and performed by the control unit 100.

Figure 2:
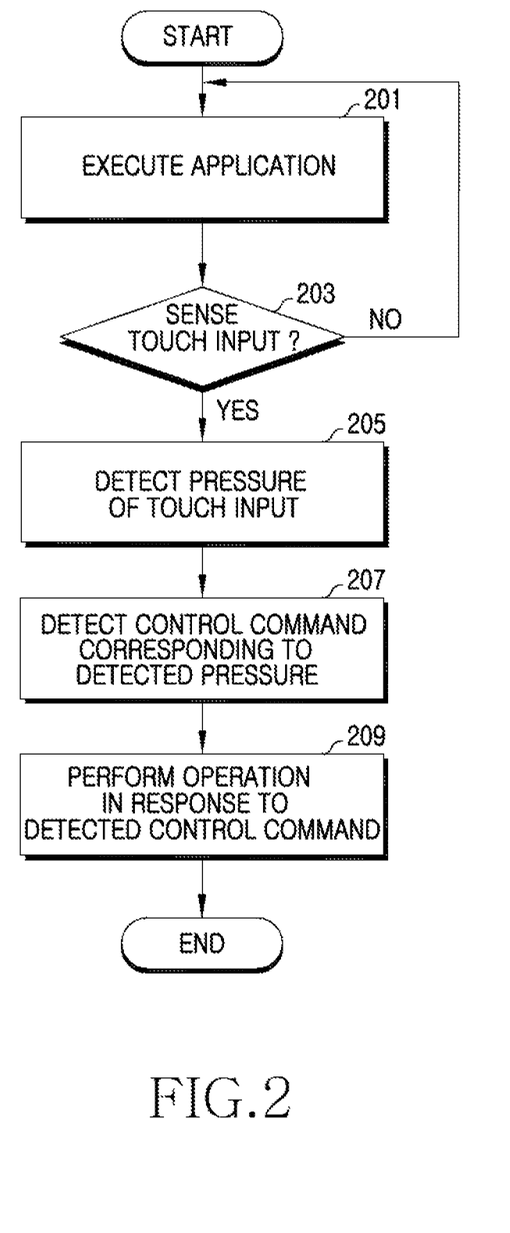
FIG. 2 is a flowchart illustrating a method for controlling an application according to an area of touch input in a portable terminal according to an exemplary embodiment of the present invention.

FIG. 2 is a flowchart illustrating a method for controlling an application according to an area of touch input in a portable terminal according to an exemplary embodiment of the present invention.

Referring to FIG. 2, in step 201, the portable terminal executes an application. Then, in step 203, the portable terminal determines a touch input from a user.

In step 203, if it is determined that there is no touch input from a user, the portable terminal returns to step 201 and again determines whether there is any touch input from a user.

Otherwise, in step 203, if it is determined that a touch input from a user is sensed, the portable terminal performs step 205, i.e., determines a pressure of the user's touch.

Herein, determining a pressure of the user's touch means that the portable terminal detects an area touched by a user. To detect a touch area sensed from the pressure of the user's touch, the portable terminal uses a number of pixels as a standard for determining the touch area. As the number of pixels included in the touch area is increased, the portable terminal may understand that a touch area is enlarged. Herein, the process for determining the touch area as above described is just an exemplary embodiment of the present invention and should not be considered to limit the scope of the present invention.

Then, in step 207, the portable terminal detects a control command corresponding to the touch area sensed from the user's touch in step 205. Herein, the control command is a type of instructions for controlling the application which is presently working, such as an image enlargement/reduction control command, a speed control command for video playing, a control command for moving a folder in a file explorer, and so on.

Then, in step 209, the portable terminal performs operations in response to the control command detected in step 207 and controls the working application.

Then, the portable terminal finishes the algorithm.

Figure 3:
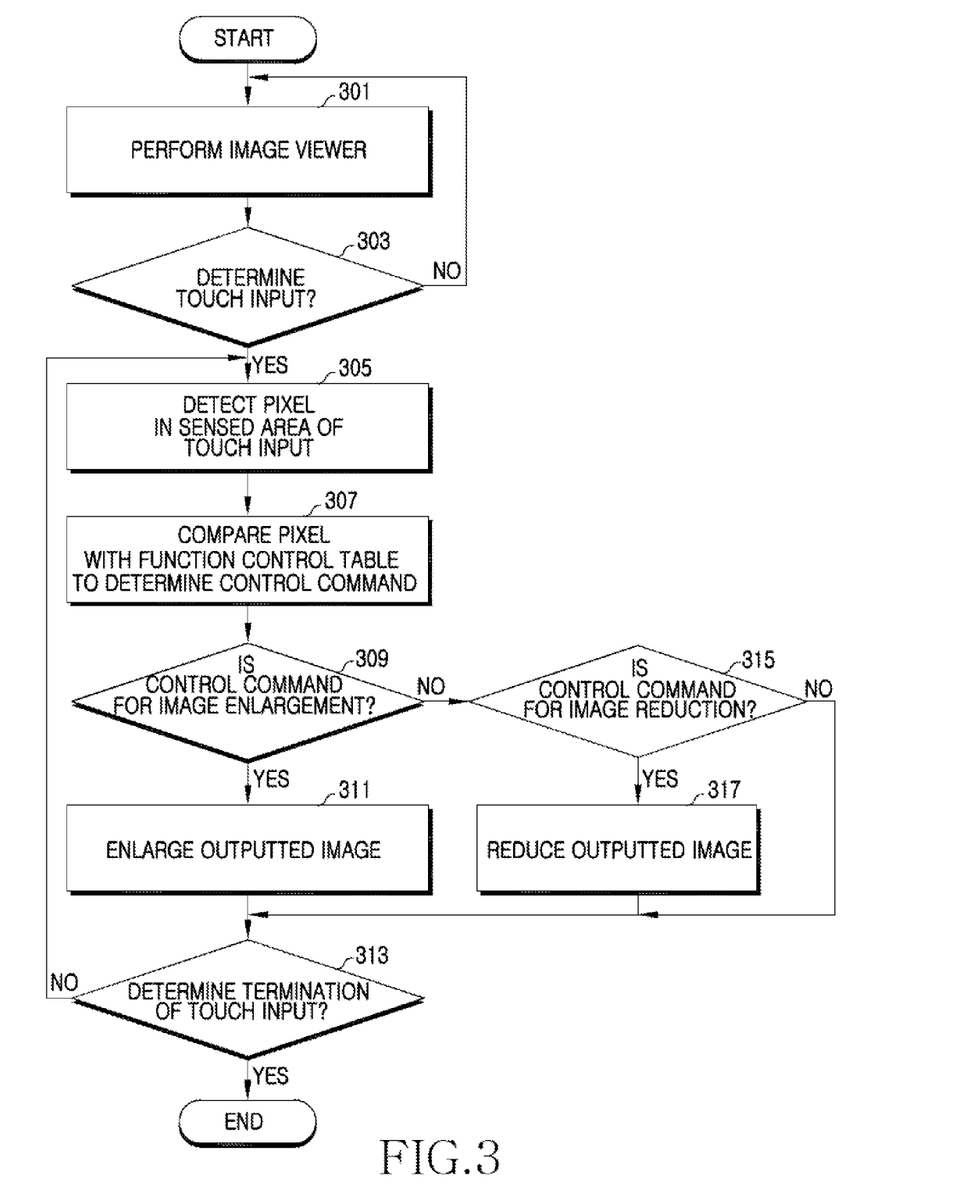
FIG. 3 is a flowchart illustrating a method for controlling an image viewer in a portable terminal according to an exemplary embodiment of the present invention.

FIG. 3 is a flowchart illustrating a method for controlling an image viewer in a portable terminal according to an exemplary embodiment of the present invention.

Referring to FIG. 3, in step 301, the portable terminal executes an image viewer. In step 303, the portable terminal determines a touch input from a user. Herein, the portable terminal detects the touch input while the image viewer is working.

In step 303, if it is determined that there is no touch input from a user, the portable terminal returns to step 301 and again determines whether there is any touch input from a user.

In step 303, if it is determined that there is a touch input from a user, the portable terminal proceeds to step 305. The portable terminal determines pixels included in an area sensed from user's touch in step 305. In step 307, the portable terminal compares the determined pixels with a function control table to determine a control command. In step 307, a process for comparing the pixels with the function control table is for detecting the control command corresponding to a touch area, and the control command is a type of instruction for controlling the image viewer which is one of presently working applications. Further, the function control table denotes a mapping table defining application control commands corresponding to each touch area touched by a user. The function control table can be expressed as Table 1 below.

TABLE 1

| Level | The number of pixels | Control command |
|---|---|---|
| 1 | 51 < the number of pixels < 60 | Enlarge an image three times |
| 2 | 41 < the number of pixels < 50 | Enlarge an image twice |
| 3 | 31 < the number of pixels < 40 | Maintain present state |
| 4 | 21 < the number of pixels < 30 | Reduce an image twice |
| 5 | 10 < the number of pixels < 20 | Reduce an image three times |

That is, when the number of pixels is in a range of level 2 (41<the number of pixels<50) while the image viewer is working, the portable terminal detects a control command for enlarging an output image twice. Also, to enlarge an image output by the portable terminal, if a previous touch input of level 2 is changed into a present touch input of level 5, the portable terminal understands that the image previously enlarged twice is reduced three times again and detects a control command for reducing the image three times.

Then, in step 309, the portable terminal determines whether the control command detected at step 307 is a control command for image enlargement. Herein, it is assumed that, in step 307, the control command for enlarging or reducing the image is determined in response to a touch area, e.g., the number of pixels.

If it is determined that there is a control command for image enlargement detected in step 309, the portable terminal performs step 311, i.e., enlarges the output image.

In contrast, if it is determined that the control command detected in step 307 is not for image enlargement, the portable terminal performs step 315, i.e., determines whether the control command detected in step 307 is a control command for image reduction.

If it is determined that there is no control command for image reduction in step 315, the portable terminal performs step 313, i.e., determines a termination of touch input.

In contrast, if it is determined that there is a control command for image reduction detected in step 315, the portable terminal performs step 317, i.e., reduces the output image.

After performing the image enlargement or the image reduction as above described, the portable terminal performs step 313, i.e., determines the termination of touch input.

If it is determined that the termination of touch input is not sensed in step 313, the portable terminal returns to step 305 again. That is, the portable terminal continuously determines a control command corresponding to a touch input before the termination of touch input and performs operations in response to the determined control command.

In contrast, if it is determined that the termination of touch input is sensed in step 313, the portable terminal finishes the algorithm.

Figure 4A:
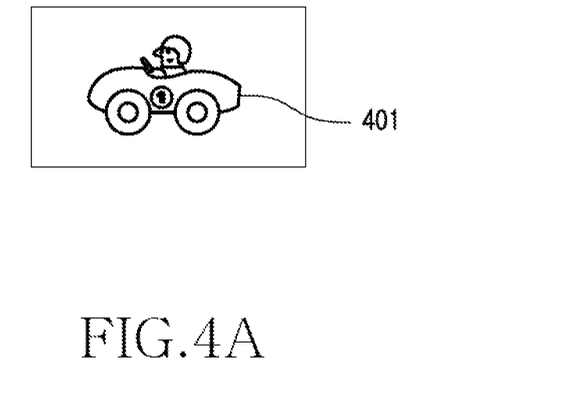
FIG. 4A illustrates a screen when an image viewer is executed in a portable terminal according to an exemplary embodiment of the present invention.
Figure 4B:
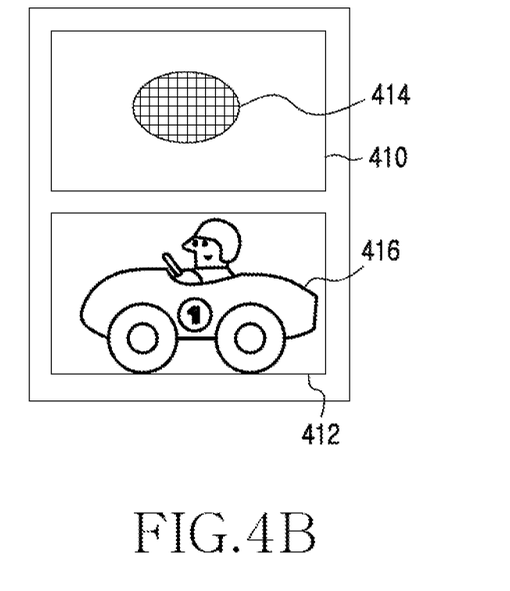
FIG. 4B illustrates a method for enlarging an output image in response to a user's touch input in a portable terminal according to an exemplary embodiment of the present invention.
Figure 4C:
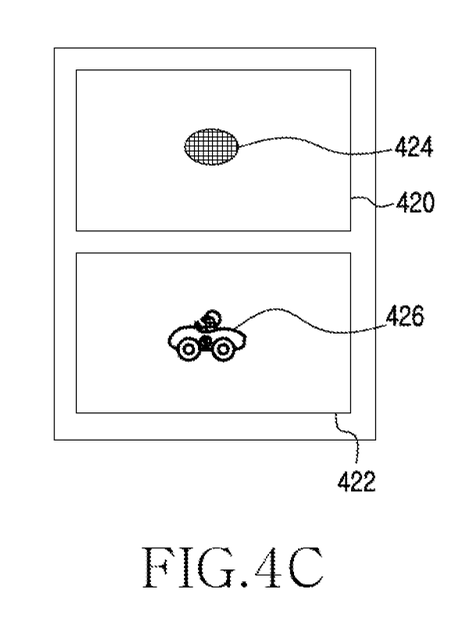
FIG. 4C illustrates a method for reducing an output image in response to a user's touch input in a portable terminal according to an exemplary embodiment of the present invention.

FIG. 4 illustrates a screen of a portable terminal controlling an application in response to a touch area touched by a user according to an exemplary embodiment of the present invention.

FIG. 4A illustrates a screen when an image viewer is executed in a portable terminal according to an exemplary embodiment of the present invention.

Referring to FIG. 4A, as illustrated, the portable terminal displays a car image 401 selected by a user.

FIG. 4B illustrates a method for enlarging an output image in response to a user's touch input in a portable terminal according to an exemplary embodiment of the present invention.

Referring to FIG. 4B, the reference numeral '410' as a screen displaying an output of the portable terminal may illustrate the output image displayed in FIG. 4A, but omits the output image for purposes of illustrating a touch area touched by a user. Also, the reference numeral '412' as a screen displaying an output of the portable terminal illustrates the output image enlarged according to a user's touch input. Herein, the reference numeral '410' and the reference numeral '412' are the same screen. For convenience of description, the touch area and the output image are separately illustrated.

First, in a state when the portable terminal displays an output image in response to the user's request, if there is a touch input, the portable terminal determines the number of pixels included in an area where a touch input is sensed, and detects the user's intention for controlling the image viewer.

For instance, when a strong pressure is received as a touch input, a touch area as illustrated in the reference numeral '414' is enlarged and the number of pixels included in the touch area is increased.

As above described, the portable terminal determines the touch area where a touch input is sensed, i.e., detects the number of pixels included in the touch area. After detecting that a user wants to enlarge the output image, the portable terminal enlarges the output image 401 and displays an enlarged image 416.

FIG. 4C illustrates a method for reducing an output image in response to a user's touch input in a portable terminal according to an exemplary embodiment of the present invention.

Referring to FIG. 4C, the reference numeral '420' as a screen displaying an output of the portable terminal may illustrate the output image displayed in FIG. 4A, but omits the output image for purposes of illustrating a touch area touched by a user. Also, the reference numeral '422' as a screen displaying an output of the portable terminal illustrates the output image enlarged according to a user's touch input. Herein, the reference numeral '420' and the reference numeral '422' are the same screen. For convenience of description, the touch area and the output image are separately illustrated.

First, in a state when the portable terminal displays an output image in response to the user's request, if there is a touch input, the portable terminal determines the number of pixels included in an area where a touch input is sensed, and detects the user's intention for controlling the image viewer.

For instance, when a weak pressure is received as a touch input, a touch area as illustrated in the reference numeral '424' is reduced and the number of pixels included in the touch area is decreased.

As above described, the portable terminal determines the touch area where a touch input is sensed, i.e., detects the number of pixels included in the touch area. After detecting that a user wants to reduce the output image, the portable terminal reduces the output image 401 and displays a reduced image 426.

In an exemplary embodiment of the present invention, as above described, if the pressure of a touch input is changed when the portable terminal includes a touch interface, the portable terminal may provide a touch input control effect (e.g., image enlargement/reduction using a multiple touch) that was previously supported in only a portable terminal including a conventional multiple screen panel.

As above described, an exemplary embodiment of the present invention provides an apparatus and a method for controlling functions of an application through a simple touch input. According to an area of touch input, the portable terminal sets a control command. Since the portable terminal may control the application in response to the touch input, complexity for controlling applications in the portable terminal can be reduced and, further, the same effect by using a multiple touch input may be obtained without use of a multiple touch panel.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for touch interface in a portable terminal, the apparatus comprising:
   a control command determination unit configured to detect a control command of an application corresponding to a size of an area touched when a touch input is sensed while the application is working; and
   a control unit configured to control an operation of the working application by using the control command detected by the control command determination unit.

2. The apparatus of claim 1, wherein the control command determination unit determines the size of the area touched, compares the size of the area with a function control table defining each control command corresponding to each touch area, and detects the control command corresponding to the area of touch input.

3. The apparatus of claim 2, wherein the control command comprises at least one of an image enlargement/reduction control command, a speed control command for video playing, and a control command for moving a folder in a file explorer.

4. The apparatus of claim 1, wherein the size of the area touched is determined by a number of pixels in a touch area where the touch input is sensed.

5. The apparatus of claim 1, further comprising:
   a touch management unit configured to detect the touch area and operate in response to the touch area,
   wherein when the touch input is received, the touch management unit provides location information of the touch input to the control command determination unit or determines data corresponding to the location information of the touch input to output the data to a display unit.

6. The apparatus of claim 1, wherein the control command determination unit determines which operation to perform based on the size of the area touched when the touch input is sensed.

7. A method for touch interface in a portable terminal, the method comprising:
   detecting a control command of an application corresponding to a size of an area touched when a touch input is sensed while the application is working; and
   controlling an operation of the working application by using the control command detected.

8. The method of claim 7, wherein the detecting of the control command of the application corresponding to the area touched comprises:
   determining the size of the area touched;
   comparing the size of the area with a function control table defining each control command corresponding to each touch area; and
   detecting the control command corresponding to the size of the area of touch input.

9. The method of claim 8, wherein the control command comprises at least one of an image enlargement/reduction control command, a speed control command for video playing, and a control command for moving a folder in a file explorer.

10. The method of claim 7, wherein the size of the area touched is determined by a number of pixels in a touch area where the touch input is sensed.

11. The method of claim 7, further comprising:
   detecting, by a touch management unit, the touch area input and operate in response to the touch area,
   wherein when the touch input is received, the touch management unit provides location information of the touch input to the control command determination unit or determines data corresponding to the location information of the touch input to output the data to a display unit.

12. The method of claim 7, wherein the operation corresponding to the control command is determined based on the size of the area touched when the touch input is sensed.

13. An apparatus for touch interface in a portable terminal, the apparatus comprising:
   a control command determination unit configured to sense a size for a touch input area touched; and
   a control unit configured to map the size of the touch input area sensed by the control command determination unit to a command for controlling a preset application.

14. A method for touch interface in a portable terminal, the method comprising:
   sensing a size of a touch input area touched; and
   mapping the size of the touch input area sensed to a command for controlling a preset application.

15. A portable terminal comprising:
   a control command determination unit configured to detect a control command of an application corresponding to a size of an area touched when a touch input is sensed while the application is working; and
   a control unit configured to control an operation of the working application by using the control command detected by the control command determination unit.

16. The portable terminal of claim 15, wherein the control command determination unit determines the size of the area touched, compares the size of the area with a function control table defining each control command corresponding to each touch area, and detects the control command corresponding to the area of touch input.

17. The portable terminal of claim 16, wherein the control command comprises at least one of an image enlargement/reduction control command, a speed control command for video playing, and a control command for moving a folder in a file explorer.

18. The portable terminal of claim 17, wherein the size of the area touched is determined by a number of pixels in a touch area where the touch input is sensed.

19. The portable terminal of claim 15, further comprising:
   a touch management unit configured to detect the touch area input and operate in response to the touch area, wherein when the touch input is received, the touch management unit provides location information of the touch input to the control command determination unit or determines data corresponding to the location information of the touch input to output the data to a display unit.

20. The portable terminal of claim 15, wherein the control command determination unit determines which control command is detected based on a size of the area touched when the touch input is sensed.

* * * * *